Dec. 15, 1970  R. H. HENDERSON  3,548,324
LOGIC CONTROL ARRANGEMENT
Filed May 20, 1968  3 Sheets-Sheet 1

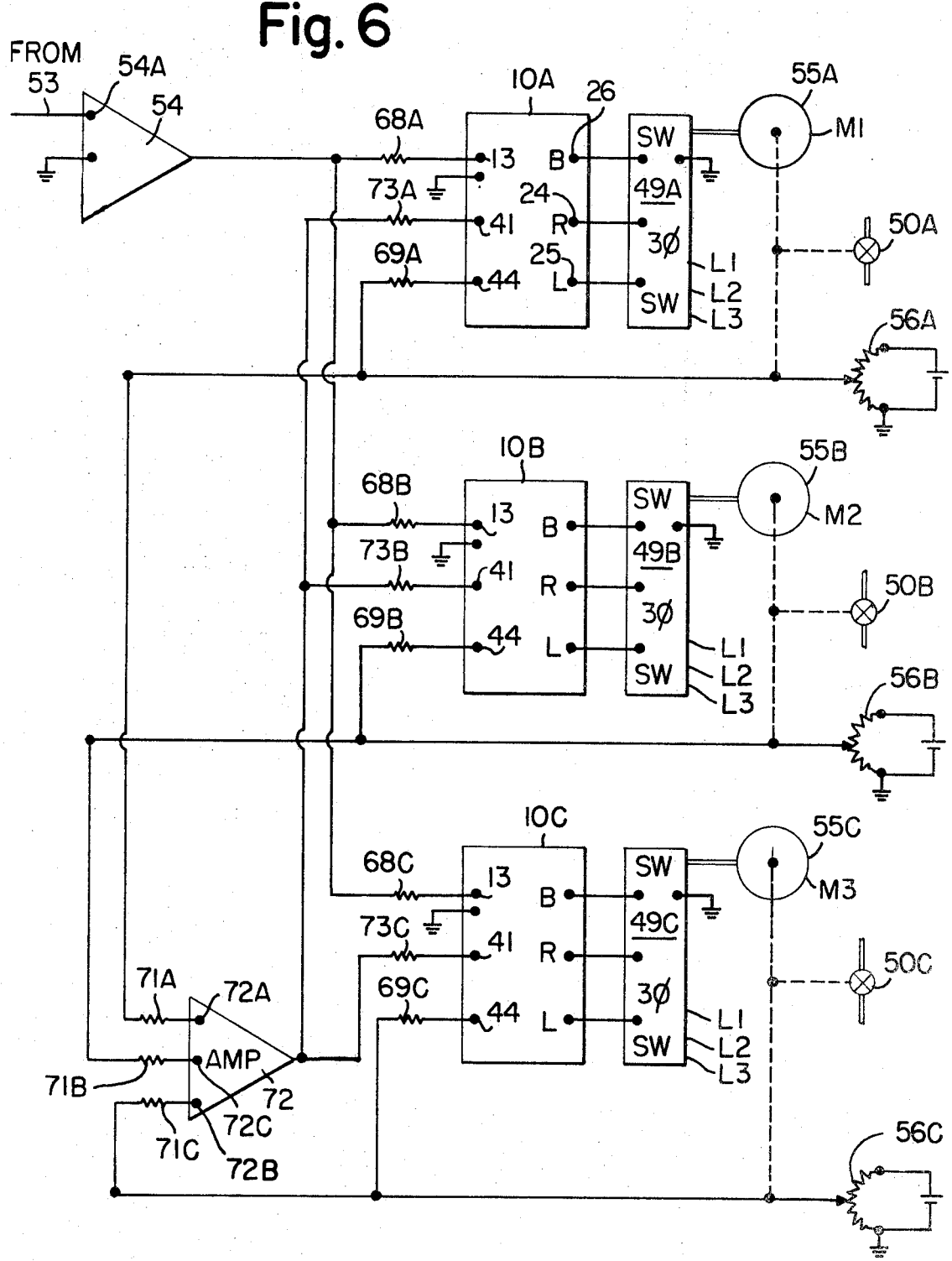

United States Patent Office 3,548,324
Patented Dec. 15, 1970

3,548,324
LOGIC CONTROL ARRANGEMENT
Rolland H. Henderson, North Wales, Pa., assignor to Leeds & Northrup Company, Philadelphia, Pa., a corporation of Pennsylvania
Filed May 20, 1968, Ser. No. 730,336
Int. Cl. H03k 17/00
U.S. Cl. 328—150                                         7 Claims

ABSTRACT OF THE DISCLOSURE

A combination of comparative amplifiers, logic circuitry, feedback circuitry for accepting analog input signals from process controllers, manual speed-control circuits, position-repeater circuits and bias signals to provide binary control signals for speed-regulation and braking of reversible drive motors for process-input control elements, speed and direction control of motors including polyphase motors and passive or dynamic equalization of the positions of input-control elements of multiple control processes.

BACKGROUND OF THE INVENTION

Classical position-control systems for drive units are not adequate because, among their disadvantages, they are basically incompatible with "bumpless" transfer between automatic and manual control. More sophisticated drive-unit control systems, including that of my prior Pat. 3,364,405, though compatible with bumpless transfer, are not well suited for duplication in multiple-input processes because attempted equalization of inputs results in compromise and because they do not produce Braking control signals in addition to, or as distinguished from, Raise and Lower signals.

SUMMARY OF THE INVENTION

A principal feature of the invention is a basic combination of a pair of comparative amplifiers, to which an analog signal may be applied, and output logic circuitry which selectively produces different control signals, dependent upon the concurrent polarities of the amplifier outputs. For use in such combination, and possibly others, each of the amplifiers is of the differential type having a single output with provision for linear feedback to the non-inverting channel of the amplifier and non-linear feedback to the inverting channel. The resultant input/output characteristic of the amplifier is such that its output is zero until the input signal attains a predetermined high value of either polarity, whereupon the output abruptly rises to a high level, of polarity dependent upon that of the input, and remains at high level until the input signal changes to a predetermined level lower than the predetermined high input level of opposite polarity, whereupon the output abruptly falls to zero.

As a desirable supplementary feature of the invention, integrating networks are provided in the basic combination to derive an impulse type of feedback from certain outputs of the logic circuitry.

Also as a desirable supplementary feature of the invention, a differentiating network is included in the basic combination for supply of an input signal derived from the position of an element subject to control by the output signals of the logic circuitry.

BRIEF DESCRIPTION OF THE DRAWINGS

For a more detailed understanding of the invention, reference is made in the following description of preferred embodiments thereof to the accompanying drawings in which:

FIG. 6 schematically illustrates a multiple input control system including a plurality of interconnected drive unit control assemblies such as shown in FIG. 1.

DESCRIPTION OF PREFERRED EMBODIMENTS

Figure 1:
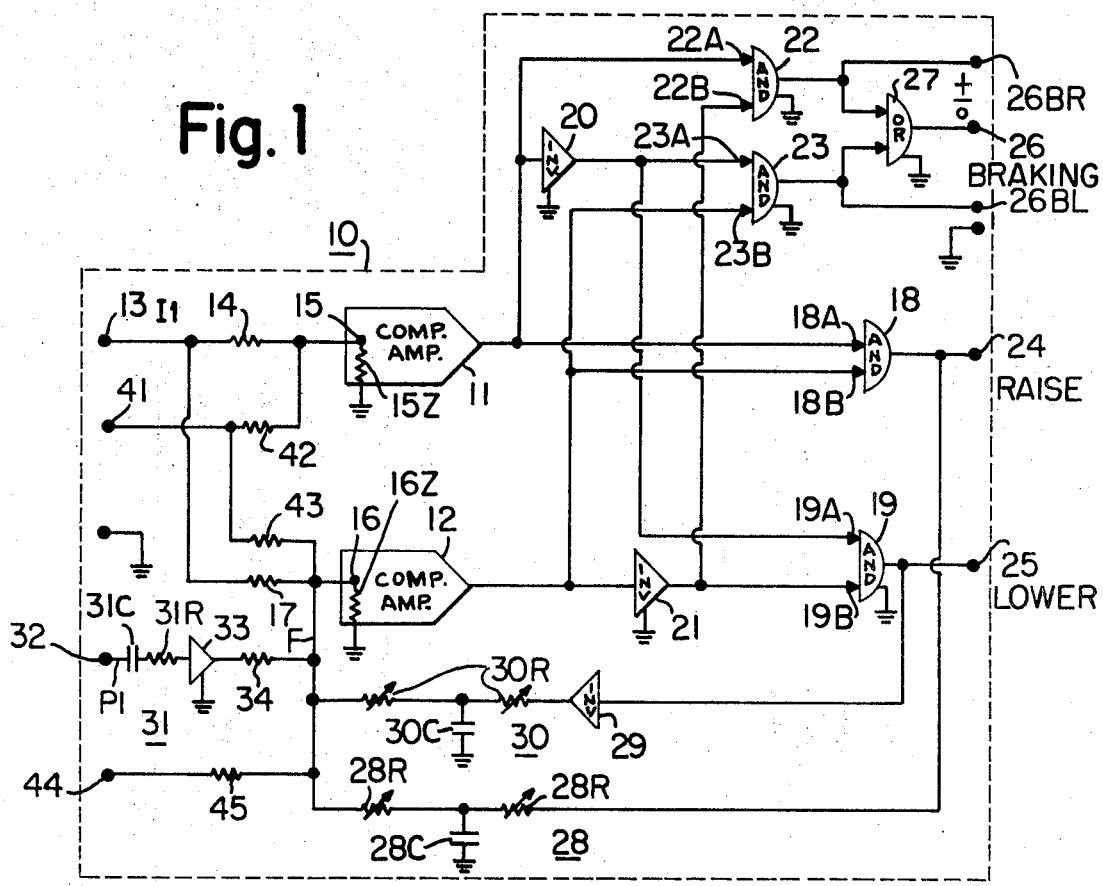
FIG. 1 schematically shows a drive unit control module or assembly.

The drive unit control module or assembly 10 of FIG. 1 includes two comparator amplifiers 11, 12 to which an input signal I1 of variable magnitude and reversible polarity may be applied. Specifically, the terminal 13 of the module is connected via summing resistor 14 to input terminal 15 of amplifier 11 and via summing resistor 17 to the input terminal 16 of amplifier 12. A feedback signal F, produced in manner later described, is applied to input terminal 16 of amplifier 12. The module terminal 41 provides for application of a bias signal to the input terminals 15 and 16 of the amplifiers via the resistors 42, 43 respectively. The module terminal 44 provides for application of a bias signal to input terminal 16 of amplifier 12 via the resistor 45.

The outputs of amplifiers 11, 12 are impressed on logic circuitry, preferably solid-state, which derives from them a Raise signal, a Lower signal, or a Braking signal depending upon the concurrent polarities of the amplifier outputs. Specifically in the logic circuitry shown in FIG. 1, the outputs of the amplifiers 11, 12 are, without reversal of their polarity, respectively applied to the inputs 18A, 18B of AND-gate 18 and, as reversed in polarity by inverters 20, 21, are applied to the inputs 19A, 19B of AND-gate 19. Thus, when the outputs of both amplifiers are of like polarity, for example, positive, both inputs of AND-gate 18 are enabled to produce a Raise signal at output terminal 24 of the logic circuitry; and when the outputs of both amplifiers are of reversed polarity, for example, negative, both inputs of AND-gate 19 are enabled to produce a lower signal at output terminal 25 of the logic circuitry. When either of the outputs of amplifiers 11, 12 is zero, neither of the AND-gates 18, 19 is enabled and no control signal appears at either of terminals 24, 25 of the drive unit control assembly.

The unreversed output of amplifier 11 and the output of amplifier 12, as reversed by inverter 21, are respectively applied to the inputs 22A, 22B of AND-gate 22. Also the output of amplifier 11, as reversed by inverter 20, and the unreversed output of amplifier 12 are respectively applied to the inputs 23A, 23B of AND-gate 23. Thus, only when the outputs of amplifiers 11, 12 are respectively of positive and negative polarity, AND-gate 22 is enabled to produce a Braking signal which may be repeated by OR-gate 27 to appear at output terminal 26 of the logic circuitry: only when the outputs of amplifiers 11, 12 are respectively of negative and positive polarity, the AND-gate 23 is enabled to produce a Braking signal which may be repeated by OR-gate 27 to appear at output terminal 26 of the logic circuitry: under all other concurrent states of the amplifier outputs, neither of the AND-gates 22, 23 is enabled and no braking signal appears at terminal 26 of the control module 10.

To provide a negative feedback signal F, or a component of such signal, the unreversed output of AND-gate 18 is applied to an integrating network 28 comprising resistors 28R and capacitor 28C, and the output of AND-gate 19, as reversed by inverter 29, is applied to the integrating network 30 comprising resistors 30R and capacitor 30C. As previously stated, the feedback signal F is applied to the input terminal 16 of amplifier 12. The networks 28, 30 provide an impulse type of feedback which, for either polarity of the output of amplifier 11, may cause the output of amplifier 12 to fall to zero and so terminate the production of either Raise or Lower signals by the logic circuitry, or may reverse the output of amplifier 12 relative to the output of amplifier 11 and so cause production of a Braking signal by the logic circuitry.

The drive unit control assembly 10 also includes a differentiating network 31 comprising resistor 31R and capacitor 31C for producing a feedback signal F having a velocity component derived from a position signal P1 as applied to input terminal 32 of the module. The output of network 31 may be amplified by amplifier 33 and applied via resistor 34 to the input terminal 16 of amplifier 12.

Figure 2:
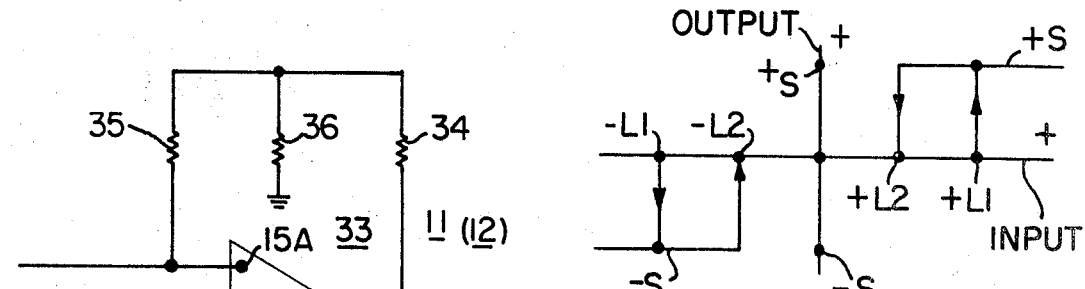
FIG. 2 is an explanatory figure referred to in discussion of FIG. 1 and other figures.

For optimized operation of the gates of the logic circuit, the input/output characteristic of each of amplifiers 11, 12 should be similar to that shown in FIG. 2. Specifically, as the input increases in positive direction, the amplifier output remains at zero until the input reaches the level +L1, whereupon the output abruptly rises to a level +S and remains there until the input signal decreases to a lower positive level +L2, whereupon the output signal +S abruptly falls to zero. As the input becomes less and less positive and passes through zero to increase in negative direction, the amplifier output remains zero until the input reaches the level −L1, whereupon the output abruptly rises to a negative high level −S. Substantially no change in output level occurs until the input signal, as decreasing in negative direction, reaches the lower negative level −L2, whereupon the negative output signal −S abruptly falls to zero. As the input signal becomes less and less negative and passes through zero to increase in positive direction, the amplifier output remains at zero until the input reaches one or the other of high levels +L1 or −L1. In brief summary, for input values within the lower limits −L2, +L2, the amplifier output is always zero: within the limits +L1, −L2, the amplifier output will be either zero or maximum positive, depending upon whether or not the positive input signal has reached limit +L1: within the limits −L2, −L1, the amplifier output will be either zero or maximum negative depending upon whether or not the negative input has reached the limit −L1.

Typical values for circuit elements of FIG. 1 are given in Table A below:

TABLE A

Resistors:
  14, 42, 43, 17, 34 45—100 kilohms
  15Z, 16Z—300 kilohms
  30R, 28R—10 megohms
  31R—5.6 kilohms Capacitors:
  30C, 28C—5 microfarads
  31C—5 microfarads Logic elements:
  18–23, 27, 29—Amelco Quad 2-Gate Type 321

Figure 3:
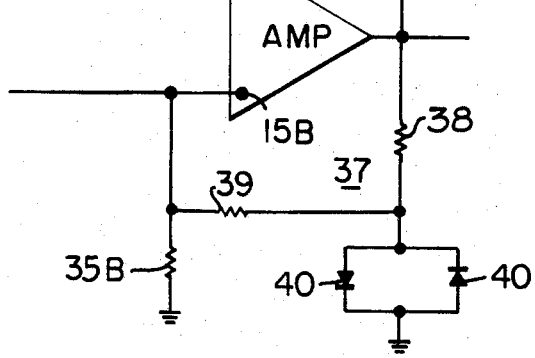
FIG. 3 is a schematic of preferred circuitry for individual comparator amplifiers of FIG. 1.

The preferred circuitry of the individual amplifiers 11, 12 to obtain the desired input/output characteristic of FIG. 2 is shown in FIG. 3. The amplifier is a differential or two-channel amplifier with a single output. A linear feedback for the non-inverting amplifier channel is provided by network 33 in which the resistors 34, 35 are connected in series between the output terminal of the amplifier and the ungrounded input terminal 15A with resistor 36 connected between the junction of resistors 34, 35 and the ground or common terminal of the amplifier. A non-linear feedback for the inverting channel of the amplifier is provided by network 37 in which the resistors 38, 39 are connected in series between the amplifier output terminal and the ungrounded input terminal 15B, with the pair of reversely-poled diodes 40, 40 each connected from the junction of resistors 38, 39 to the ground or common terminal of the amplifier. Resistor 35B is connected between input terminal 15B and the ground or common terminal.

Typical values of circuit elements of FIG. 3 appear in Table B below.

TABLE B

Figure 4:
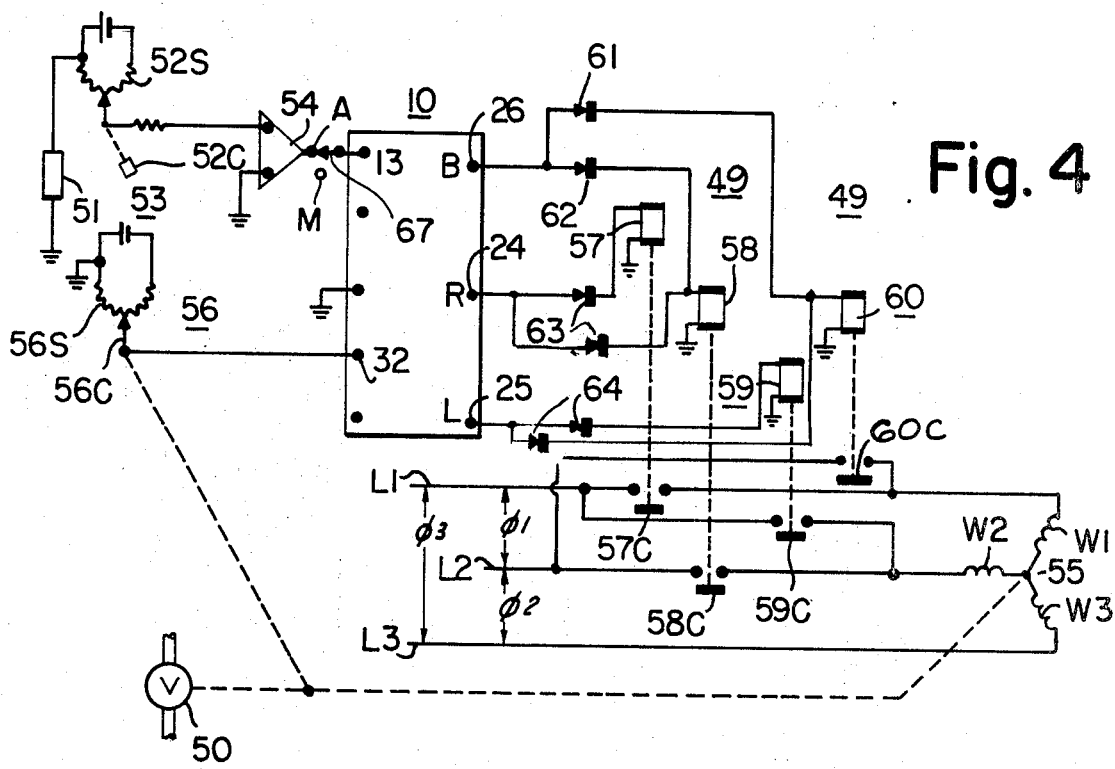
FIG. 4 schematically illustrates a process control system with the drive unit control assembly of FIG. 1 shown in block.

Resistors:
  34—51 kilohms
  36—100 ohms
  35A, 35B—24 kilohms
  38—10 kilohms
  39—187 kilohms Diodes:
  40—S669G Amplifiers:
  11, 12—Motorola Type 1433P In FIG. 4, the drive unit control module 10 of FIG. 1 is shown incorporated in the system for varying the position of a process-input control element, exemplified by valve 50 automatically to maintain a substantially constant value of a process variable.

The transducer 51 produces a DC output signal whose magnitude varies as a function of a process variable, for example, temperature, pressure, rate of flow, or the like. The setpoint may be selected by adjustment of potentiometer contact 52C relative to the potentiometer slidewire 52S so that the reference signal across the effective portion of the slidewire 52S is equal and opposite to the output of the transducer at the desired value of the process variable. Thus, when the process variable is at the desired value, the output of the measuring network 53 provides a zero error signal for the input of the controller amplifier 54. When, however, the process variable rises above or falls below the setpoint, the resulting error signal applied to the terminal 13 of the drive unit control module 10 is of polarity and magnitude corresponding with the sense and extent of the deviation of the process variable from the setpoint. This signal is applied to both comparator amplifiers 11, 12 of module 10, as above discussed.

In FIG. 4, the drive motor 55 for the final control element 50 is also coupled to a DC potentiometer slidewire 56S, or its relatively adjustable contact 56C, so that the signal across the effective portion of slidewire 56S corresponds with the position of the final control element 50. This position signal is applied to terminal 32 of the control module which, as discussed in connection with FIG. 1, is connected to the comparator amplifier 12 via a differentiating network 31. Thus, during movement of the final control element, the comparator amplifier 12 receives a signal whose amplitude and polarity depend upon the velocity and sense of movement of the final control element 50.

In FIG. 4, the drive motor 55 is of three-phase heavy-duty type for excitation from the three-phase lines L1, L2, L3 under control of module 10 via the switching afforded by power relays 57–60 and diodes 61–64. When a Raise signal appears at terminal 24 of module 10, because of satisfaction of the logic of AND-gate 18 (FIG. 1), the relays 57 and 58 are energized to connect motor windings W1, W2 in series between power lines L1, L2 of phase $\theta1$; to connect motor windings W2, W3 in series between lines L2, L3 of phase $\theta2$; and to connect motor windings W1, W3 in series between lines L1, L3 of phase $\theta3$. The resulting rotation of motor 55 and movement of final control element 50 are in direction to raise the value of the process variable. When a Lower signal appears at terminal 25 of module 10, because of satisfaction of the logic of AND-gate (FIG. 1), the relays 59, 60 are energized to connect motor windings W2, W1 in series between lines L1, L2, to connect motor windings W1, W3 in series between lines L2, L3, and to connect motor windings W2, W3 between lines L1, L3. In consequence, the rotation of motor 55 and movement of final control element 50 are now in reverse to lower the value of the process variable.

With motor 55 energized for running in either direction, termination of the Raise or Lower signal causes the relays 58, 57 or 59, 60, as the case may be, to drop out. With all relays now deenergized, no more power is applied to the motor, which accordingly decelerates or coasts while continuing to turn in the same direction.

If during such coasting relative polarity of the outputs of comparator amplifiers 11, 12 satisfy the logic requirements of either of AND-gates 22, 23 (FIG. 1), the resulting Braking signal appearing at terminals 26 of module 10 results in energization of relays 58 and 60. In consequence, the motor windings W1, W2 are short-circuited in a path including them and the now-closed relay contacts 58C, 60C. The motor 55 is, therefore, rapidly brought to a stop by dynamic braking action.

A typical operation of the system of FIG. 4 is as follows:

(1) When the error signal from the process controller 53, 54 causes the outputs of both comparator amplifiers 11, 12 (FIG. 1) to snap to the positive level +S (FIG. 2), the logic requirement of gate 18 is satisfied and power is supplied to motor 55 via relay contacts 58, 57 for energization in Raise direction.

(2) As the drive unit moves, the rate of change or velocity signal derived by network 31 (FIG. 1) and slidewire 56S is fed back to comparator amplifier 12, causing its output to revert to zero state if and when it becomes equal in magnitude to the error signal. In such case, the logic of gate 18 is no longer satisfied and supply of power to motor 55 is terminated by drop-out of relays 58, 57.

(3) If the drive unit is coasting too fast and would overshoot the desired new position of final control element 50, the velocity signal will exceed the controller error signal and at level +L will cause the output of amplifier 12 to snap to negative level —S. The logic requirement of gate 22 is now satisfied by the positive output of comparator amplifier 11 and the inverted negative output of comparator amplifier 12. The drive unit is accordingly braked by closure of contacts 58C, 60C of relays 58, 60 as energized by the Braking signal.

(4) The impulse feedback signal produced by network 28 is, in the system of FIG. 4, effective for small error signal to compensate for delays inherent in the differentiating amplifier.

From the foregoing, it should be clear how AND-gates 19, 23 and networks 30, 31 are similarly involved in control of motor 55 for rotation in opposite direction. When the reverse polarity error signal from the process controller 53, 54 attains predetermined high level, the outputs of both amplifiers snap to the negative levels —S.

Figure 5:
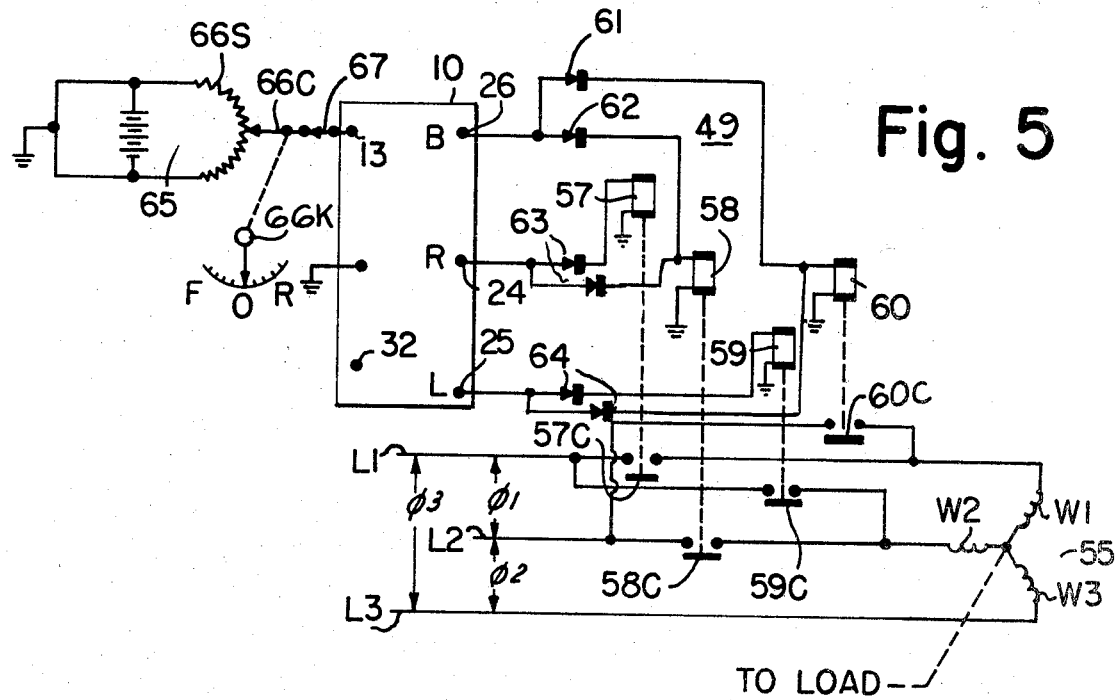
FIG. 5 schematically illustrates a manually-operable motor control system including the drive unit control assembly of FIG. 1.

In FIG. 5, the drive unit control module of FIG. 1 is shown incorporated in a system for manually selecting or adjusting the speed of a motor at which it is automatically maintained over a substantial range of variation of such operating factors as load and supply-source voltage.

For regulation of the speed of a three-phase motor to be operated in either direction, the module 10 may, as in FIG. 4, provide Raise, Lower and Braking signals to a three-phase switch 49 formed by relays 57–60 and isolating diodes 61–64. The input signal for the two comparator amplifiers 11, 12 of module 10 may be provided by a bridge network 65 including slidewire 66S and its relatively adjustable contact 66C. To initiate operation of motor 55 in one direction or the other, the control knob 66K is manually moved in corresponding direction to the selected speed-setting displaced from the zero or balance-point setting, so to apply a positive signal or a negative signal of corresponding magnitude to terminal 13 of module 10. The resulting Raise or Lower signal produced by the logic circuitry of the module is effective, as previously described, to initiate operation of motor 55 in the desired direction. During the subsequent operation of motor 55, the impulse feedback signal produced by one or the other of networks 28, 30, depending upon the selected direction of rotation and applied to comparator amplifier 12, intermittently overrides the preselected magnitude of the input signal from network 65 and so intermittently turns off the AND-gate 18 or 19. The speed of motor 55 is thus automatically held at an average speed corresponding with the selected setting of the slidewire 66S.

Such manual control of motor 55 may be added to the automatic process control system of FIG. 4 for manual start-up or shut-down purposes by inclusion of a switch 67 which for position M connects terminal 13 of module 10 to the manual control circuit 65 (FIG. 5) which for another position A connects terminal 13 to the output of the automatic process controller 53, 54 (FIG. 4). In such system, the transition from manual to automatic is bumpless since the controller output can easily be made zero by making the input voltage to the amplifier the same potential level as the feedback voltage. Transferring from automatic to manual control is inherently bumpless since transfer is to a zero level signal prior to operation of manual raise or lower circuits.

For automatic control of multiple input processes, the drive units for the respective final control elements are each associated with a control module 10 and a power switch controlled by that module's output signals.

In the particular arrangement shown in FIG. 6, three inputs of a process are respectively variable by the final control elements 50A–50C respectively adjustable by drive motors 55A–55C. The output of an automatic process controller, such as network 53 of FIG. 4, is applied to one input terminal 54A of a two-channel differential amplifier 54 whose output is applied via resistors 68A–68C respectively to terminal 13 of modules 10A–10C for application to the comparator amplifiers 11, 12 of each module.

The individual position signals produced by position slidewires 56A–56C are respectively applied to terminal 44 of modules 10A–10C via resistors 69A–69C. The individual position signals are also respectively applied via resistors 71A–71C to input terminals 72A–72C of summing amplifier 72.

The output of the summing amplifier, which is representative of the average of the concurrent positions of final control elements 50A–50C, is applied via resistors 73A–73C to input terminal 41 of modules 10A–10C. Thus, the drive units for final control elements 50A, 50B and 50C are subjected to proportional control action and also dynamic equalization for each position relative to the positions of the other final control elements. These control actions provide approximate maintenance of an equalized relationship during movement of the final control elements to a stable state position. The same techniques may, of course, be applied when the number of process inputs to be controlled is greater or less than three.

What is claimed is:

1. A control arrangement comprising
   a combination of two comparator amplifiers having intercoupled input circuits and each having an input/output characteristic such that its output is zero for increasing magnitude of either polarity of the input signal until a predetermined high input level is reached, whereupon the output abruptly rises to high level of polarity dependent upon the polarity of the input signal, the output then remaining at high level until the input signal changes to a predetermined level lower than the predetermined high input level, whereupon the output abruptly returns to zero, and
   binary logic circuitry to which the outputs of said amplifiers are applied comprising a first gate means enabled to produce one control signal when the outputs of said amplifiers are of one like polarity, and a second gate means enabled to produce a second control signal when the outputs of said amplifiers are of the other like polarity.

2. A control arrangement as in claim 1 additionally including a feedback network connected between the output of one of said gate means and the input of one of said amplifiers.

3. A control arrangement as in claim 1 additionally including a first network for deriving from the output of one of said gate means a feedback opposing the amplifier input when of one polarity, and a second network for deriving from the output of the other of said gate means a feedback opposing the amplifier input when of opposite polarity.

4. A control arrangement as in claim 1 in which the logic circuitry additionally includes two gate means, one of which is enabled to produce a third control signal only when the outputs of the first and second amplifiers are relatively reversed in one sense and the other of which is enabled to produce a fourth control signal only when the outputs of the first and second amplifiers are relatively reversed in the opposite sense.

5. A control arrangement as in claim 1 in which the input circuitry of said amplifiers includes means for applying to both of them a variable bias.

6. A control arrangement as in claim 1 in which the input circuitry of only one of said amplifiers includes means for applying to it a variable bias.

7. A control arrangement as in claim 1 in which the input circuitry of one of said amplifiers includes a differentiating network.

References Cited

UNITED STATES PATENTS 3,341,816   9/1967   Davis _____ 328—116

DONALD D. FORRER, Primary Examiner

J. D. FREW, Assistant Examiner

U.S. Cl. X.R.

328—116, 117, 147, 150; 318—20.245, 20.390, 20.395